United States Patent [19]

Owens

[11] Patent Number: 4,594,685
[45] Date of Patent: Jun. 10, 1986

[54] WATCHDOG TIMER

[75] Inventor: Jeffrey Owens, The Colony, Tex.

[73] Assignee: General Signal Corporation, Stamford, Conn.

[21] Appl. No.: 507,413

[22] Filed: Jun. 24, 1983

[51] Int. Cl.[4] .................... G06F 9/22; G06F 11/28
[52] U.S. Cl. .................................. 364/900; 371/16
[58] Field of Search ... 364/200 MS File, 900 MS File; 371/16, 19, 61

[56] References Cited

U.S. PATENT DOCUMENTS

| | | | |
|---|---|---|---|
| 3,749,897 | 7/1973 | Hirvela | 371/16 |
| 4,072,852 | 2/1978 | Hogan | 364/900 X |
| 4,472,789 | 9/1984 | Sibley | 364/900 |

OTHER PUBLICATIONS

"Improved µC Watchdog Timer Detects Errors", Mackall, Digital Design, Apr. 1978, p. 72.

Primary Examiner—Harvey E. Springborn
Attorney, Agent, or Firm—Pollock, Vande Sande & Priddy

[57] ABSTRACT

The invention provides apparatus and method to verify appropriate program execution. Hardware external to a processor includes a resettable timer and a shift register for storing and shifting a bit pattern. Internally of the processor a bit pattern is also manipulated by a routine which also outputs a clock signal. A selected bit from each of the patterns is compared on each clock signal. If the clock signal repeats at a sufficiently rapid rate to keep the timer from expiring and, if the comparison is favorable, the processor is allowed to run; otherwise it is reset.

11 Claims, 3 Drawing Figures

WATCHDOG TIMER

FIELD OF THE INVENTION

The invention relates to verifying appropriate program execution in a processor, such as a microprocessor.

BACKGROUND ART

As digital processors, and especially microprocessors, are applied to a wide variety of tasks, it has become apparent that the processors are subject to failure. Desirably, auxiliary apparatus is arranged to restart the processor in the face of such a failure on the assumption that the condition causing the failure was temporary, and if restarted, the processor will continue to run. The use of of such techniques and the associated apparatus reduces the burden on maintenance personnel.

However, it is also apparent that it may sometimes be necessary to determine or verify that the processor is actually executing the steps which are expected of it. In this way, we can verify that the appearance it gives to the outside world of appropriate functioning, actually corresponds to the steps carried out internal to the processor. Thus, it is not only necessary for the processor to give the appearance of actually working, but what is desired is some verification that the processor is actually functioning correctly.

Prior art solutions have included what is sometimes termed a watchdog timer or the like. This solution provides, external to the processor, a timer which is set to time out a predetermined period, that period might be several seconds, or it might even be less than a second, for example 200 milliseconds. The program included in the processor is arranged to output a pulse at a rate which is more frequent that the period being timed by the timer. Additional external apparatus is arranged responsive to the output pulse to reset the timer each time the output pulse is present. So long as the processor is functioning correctly, the program causes the processor to output the necessary pulse to reset the timer, the timer begins timing out a new period, and before the new period expires, it is again reset, and so forth. See U.S. Pat. Nos. 4,363,092; 4,072,852 and 3,795,800, for example.

Unfortunately, experience has shown that this method is far from foolproof. If for some reason the processor falls into a loop which causes the pulse to which the timer is responsive to be output at a sufficiently rapid rate to maintain the timer reset, the timer gives the appearance that the processor is functioning correctly. In reality, however, this may merely be due to the processor's faulty operation coincidentally providing the output necessary to hold off the reset. Admittedly, this is an unlikely condition, but the probability of this condition is sufficiently great so that the watchdog timer by itself is inadequate to provide sufficient evidence of proper processor functioning.

Another technique which has also been employed is providing redundant processors, both operating with the same program and on the same data. Periodically, data or controls from both processors are compared (in apparatus which may be external to both processors); the system being arranged on the assumption that if the comparison is an equality, then no failures have occurred. This prior art arrangement has at least two defects, in the first place the assumption that an equal comparison indicates lack of failures may be overly optimistic, and the second defect is the more than 100% increase in overhead for the purpose of the checking function.

It is therefore an object of the present invention to provide apparatus for tracking appropriate program execution for decreasing the probability that improper processor functioning can give the appearance of appropriate operation. It is another object of the present invention to so decrease the probability of the failure to detect improper processor operation without requiring complicated apparatus external to the processor, nor execution, internal to the processor of complicated processing dedicated solely to proving appropriate operation. It is thus a further object of the invention to provide relatively simple apparatus for verifying appropriate program execution, but yet capable of significantly decreasing the probability of failing to detect improper program execution.

SUMMARY OF THE INVENTION

The invention meets these and other objects of the invention by providing a relatively few hardware elements external to the processor and a relatively few program steps which in cooperation distinctively indicate improper program execution.

The apparatus external to the processor includes a timer and a device for manipulating a bit pattern. While in an example to be described hereinafter, the bit pattern manipulated is one byte (eight bits), those skilled in the art will perceive that the length of the bit pattern may be changed, increasing the length of the bit pattern provides for increased protection in a manner to be described.

The invention also includes the addition of several program steps to the operating sequence of the processor, whose operation is to be verified. The additional program steps fall into two classes, a first class comprises a watchdog routine. The watchdog routine is different from the prior art in that it includes two functions, a first function which manipulates a particular output bit (or clock bit) each time the watchdog routine is called; more particularly, the particular output bit is sequentially altered in condition, from an initial condition to a temporarily different condition, and back to the initial condition. It should be apparent that this particular manipulation produces a pulse. As will be described, this pulse is used in a clocking function. In addition, the watchdog routine, when called, has passed to it a particular bit pattern. The watchdog routine, in its second function, performs a predetermined manipulation of this bit pattern, outputs a selected bit of the bit pattern at a predetermined output bit position and finally passes the now manipulated bit pattern back to the calling routine. The second class of program steps added in accordance with the invention includes a calling routine for calling the watchdog routine. There are two requirements for the calling routine, first it must maintain a bit pattern which can be passed to the watchdog routine, and accept a manipulated bit pattern from the watchdog routine so that at a later time the manipulated bit pattern can be passed back to the watchdog routine. Secondly, the calling routine must be executed at a rate which is sufficiently fast so that the clock bit (which is sequentially altered by the watchdog routine) produces an output pulse stream at a rate sufficient to maintain the timer in a reset condition. As will be described, the calling routine is made up of a number of calls, each located in a different position in the stream of program steps.

In addition to the provision of these two classes of program steps, the processor also sets aside a reserved storage location for each different one of the calls. Each storage location requires a bit capacity equal to the length of the bit pattern being manipulated. While the storage locations could all be concentrated in one region, preferably the storage locations which are reserved for the use of the calls are scattered throughout read/write memory, for reasons which will appear hereinafter.

External to the processor is a bit pattern manipulating device which stores a particular bit pattern. Each time the clock bit (the output bit which is sequentially altered), undergoes a sequential alteration the bit pattern manipulating device performs two functions: it compares the selected output bit from the processor with a stored bit of the bit pattern and indicates whether that comparison produces an equality or inequality, and it also manipulates the stored bit pattern in a predetermined fashion identical to the fashion in which the watchdog routine manipulates its bit pattern.

Assuming that the program execution is faultless, the calling routine will call the watchdog routine at a sufficiently rapid rate so that the clock bit will maintain the timer in a reset state. In addition, each time the watchdog routine is called, it manipulates its bit pattern, and outputs a selected bit; external to the processor the bit pattern manipulating device also manipulates its stored bit pattern and compares a selected bit from that bit pattern with the selected bit output by the processor. Faultless operation will continually produce an equality result from the comparison. External to the processor, in addition to the timer and the bit pattern manipulating device, is a reset circuit. The reset circuit is provided to reset the processor in the event that either the timer times out or the comparison indicates an inequality.

It should be apparent to those skilled in the art that the timer portion of the invention is similar to the prior art watchdog timers. However, the watchdog routine, in manipulating a bit pattern, will result in an equality result from the comparison only so long as the calling routine operates in its intended fashion. Any short circuiting of the calling routine (for example because the program loop is spuriously shortened) can only result in an equality result from the comparison under a fortuitous coincidence. And, of course, as the length of the bit pattern being manipulated is increased, the probability of this coincidence repeatedly occurring decreases.

Preferably, the different calls forming the calling routine are strategically located throughout the main program loop at critical locations. Since holding off the reset requires each one of the calls to be executed, the failure to reach any particular location in the main program loop will be evidenced, at some point in time, by an inequality in the bit comparison effected external to the processor. Furthermore, by strategically locating the storage locations which are associated with the calls, throughout read/write memory, any processor fault which erroneously alters any one of these storage locations (even though the program sequence is correctly executed) will also be evidenced by an inequality comparison.

Accordingly, then, the invention provides apparatus for tracking appropriate program execution of a processor including:

first segment program means, in said processor, for at times calling a watchdog routine and for passing a bit pattern to said watchdog routine and accepting a manipulated bit pattern therefrom, second segment program means including said watchdog routine for outputting a particular bit of said bit pattern passed on said call, for manipulating said bit pattern in a predetermined fashion, for returning said manipulated bit pattern and for sequentially changing another output bit from an initial condition to a different temporary condition, back to said initial condition, and external to said processor, bit pattern means for comparing said particular bit with a selected bit of a stored bit pattern and for manipulating said stored bit pattern in a manner identical to said predetermined fashion, each time said another output bit exhibits said sequential changes, and reset means for resetting said processor if said comparison effedted by said pattern means results in an inequality.

In addition to the foregoing aspects, the invention can also provide an alternative basis for indicating a failure in the processor, which is based on the period between the sequential changes in the clock bit. That is, in addition to testing the equality between a selected bit of the watchdog routine, manipulated bit pattern, and the bit pattern manipulating device bit pattern, a timer is provided which is reset each time the clock bit undergoes its sequential alterations, i.e. each time a pulse is produced at a particular output pin. The reset means is arranged to reset the processor in the event that the timer expires.

Accordingly, in this aspect, the invention provides apparatus for tracking appropriate program execution of a processor including a program loop, including:

first segment program means in said processor, for at times calling a watchdog routine and for passing a bit pattern to said watchdog routine and accepting a bit pattern therefrom, second segment program means including said watchdog routine for outputting a particular bit of said bit pattern passed on said call, for manipulating said bit pattern in a predetermined fashion, for returning said manipulated bit pattern and for sequentially changing another output bit from an initial condition, to a different temporary condition, and back to said initial condition and external to said processor, timer means responsive to said another output bit for maintaining said timer means in one condition so long as said another output bit is sequentially changed at a rate in excess of a threshold rate and for attaining a different condition if said another output bit fails to exhibit said sequential changes at a rate in excess of said threshold rate, bit pattern means for comparing said particular bit with a selected bit of a stored bit pattern and for manipulating said stored pattern in a manner identical to said predetermined fashion, each time said another output bit exhibits said sequential changes, and reset means for resetting said processor if either said timer means achieves said different condition or if said comparison, effected by said bit pattern means, results in an inequality.

In another aspect, the invention provides a method of tracking appropriate program execution of a processor including the steps of:

a. distributing a plurality of calls within said program whose execution is to be checked, b. each of said calls retrieving the contents of a first predetermined storage location, calling a watchdog routine, and on return from said watchdog routine, writing a bit pattern received from said watchdog routine to a second predetermined storage location, c. and providing in said program, said watchdog routine to effect the functions of:

1. outputting a bit from a bit pattern received from said call at a first output location, 2. manipulating said bit pattern and passing said bit pattern on a return from said call, 3. providing a sequential alteration at a second output location from an initial condition, to a temporarily different condition, and back to said initial condition, and 4. returning from said call, and external to said processor whose execution is to be checked providing for storage of a bit pattern, manipulating said bit pattern each time said second output location undergoes a sequential alteration, comparing an output bit at said first output location with a selected bit of said stored bit pattern, and resetting said processor in the event said comparison produces an inequality.

BRIEF DESCRIPTION OF THE DRAWINGS

The present invention will now be described so as to enable those skilled in the art to practice the same in the following portions of this specification, when taken in conjunction with the attached drawings in which.

DETAILED DESCRIPTION OF PREFERRED EMBODIMENTS

Figure 1:
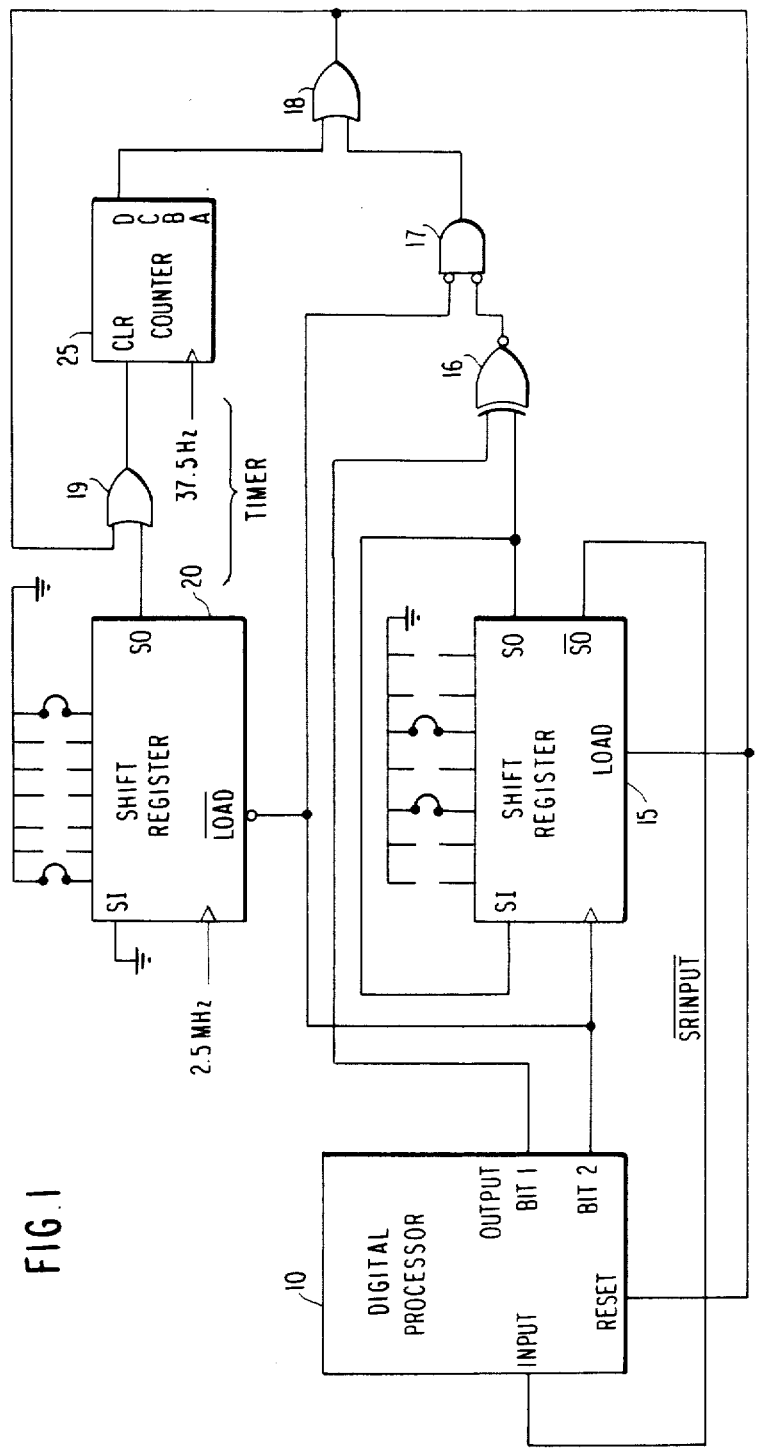
FIG. 1 is a block diagram of apparatus incorporating the invention for checking on the operation of a processor.

FIG. 1 is a block diagram illustrating apparatus embodying the invention. More particularly, FIG. 1 illustrates a processor 10, which may be a digital processor, and more specifically, a digital microprocessor. Other apparatus usually employed with the digital processor 10 is not illustrated although such apparatus is well known to those skilled in the art. The digital processor 10 includes an input terminal (labelled INPUT), an output port of which two bit positions are identified, BIT1 and BIT2, and a reset terminal (labelled RESET). The processor 10 may respond to a signal on the reset terminal for resetting its operations, will respond to a signal on its input terminal in a manner to be explained, and provides outputs at its terminals BIT1 and BIT2 as described hereinafter. As will become apparent, the outputs BIT1 and BIT2 need not be physically part of the same output port.

External to the processor 10 is a bit pattern manipulating device which performs the functions of maintaining a bit pattern, manipulating the bit pattern in a predetermined fashion at appropriate times, and comparing a selected bit of the stored bit pattern with a bit (BIT1) output by the processor 10. In addition, a timer is provided which is clocked by a signal at BIT 2. Each time the timer is clocked, it is reset. The timer is arranged to time out a predetermined period, and if not reset within that predetermined period, it achieves a distinctive condition i.e it expires. If at any time the timer achieves its distinctive condition or the comparison of the bit pattern means indicates an inequality, the digital processor 10 is reset inasmuch as either condition indicates a failure.

More particularly, the timer includes a shift register 20 and a counter 25. Each time a clocking signal (BIT 2) is produced by the processor 10, the pattern stored in the shift register 20 is reloaded through its parallel inputs. The shift register 20 is read out serially at a high rate through its SO terminal. The pattern includes one or more "high" bits each of which serves to clear the counter 25. Since the shift in terminal, SI, is arranged to input "low" bits, the shift register 20 must be reloaded periodically or it will cease to be effective to clear the counter 25. Counter 25 is clocked at a regular rate (in one example 37.5 Hz). The number of stages of the counter and the clocking rate are arranged so that the clocking output of the digital processor 10 must appear at a sufficiently rapid rate, (a threshhold rate) or the counter will count up to such a count as to provide an output, indicating it has attained its expired condition, reflecting of failure of processor 10. The bit pattern loaded into shift register 20 is, in the main, arbitrary, but it must have at least one high bit, and the first bit shifted out should be low. The reason for this preference is explained below.

The bit pattern manipulating device includes shift register 15. The shift register 15 maintains a stored bit pattern and manipulates that bit pattern by recirculating it, i.e. from its output terminal SO to its input terminal SI. The bit pattern has one bit output at SO and input at SI, each time the shift register 15 is clocked (BIT 2). The bit output from the shift register 15 is provided as one input to an exclusive NOR gate 16. The other input to the gate 16 is provided by an output of the digital processor 10 (BIT 1). The output of the gate 16 depends on the comparison of the two bits provided on its input, that comparison is either an equality or an inequality. The same clocking signal which clocks shift register 15 is also coupled to gate 17, which is partially enabled by the clocking signal If the result of the comparison is an inequality, the gate 17 is fully enabled.

Accordingly, an output is provided by the counter 25, or the gate 17, if either the timer expires or the result of the comparison is an inequality. The reset device includes an OR gate 18 which provides a resetting signal to the processor 10 if either condition is satisfied. The output of gate 18, in addition to resetting the processor 10, also provides for reloading the shift register 15 with the bit pattern provided at its parallel inputs and for clearing the counter 25 via the OR gate 19.

Figure 2:
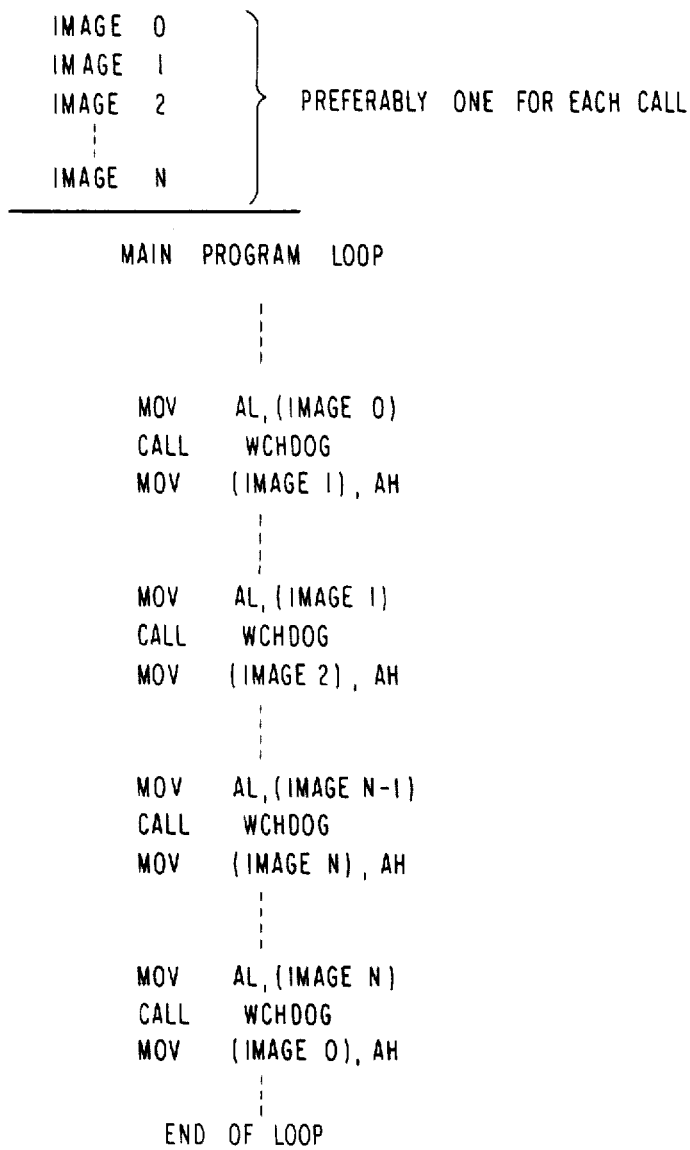
FIG. 2 illustrates portions of a main program loop incorporating the present invention.
Figure 3:
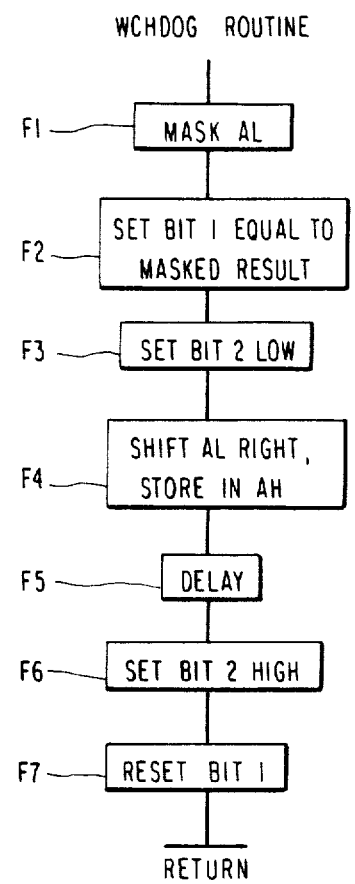
FIG. 3 illustrates a typical watchdog routine, called by the main program loop, and embodying the present invention.

Before describing the initialization of the apparatus shown in FIG. 1, or its detailed operation, reference is made to FIGS. 2 and 3 to illustrate the processes carried out by the processor 10, complementary to the apparatus shown in FIG. 1.

FIG. 2 illustrates a main program loop, beginning at that designation and ending at the designation "End of Loop". Typically, the loop will be arranged to be traversed in a predetermined amount of time, and one of the hardware requirements is to ensure that the loop is traversed at the appropriate rate. Another requirement is to ensure that the loop is completely traversed, i.e. that it is not spuriously shortened. To effect these purposes, the loop has added to it a number of calls; the number of calls is determined in part by the speed with which failure detection is required and preferably, available memory. In addition to the different calls inserted in the main program loop, the processor 10 also has a register set aside for each call in the loop, and thus since the loop shown in FIG. 2 includes N+1 calls, the processor 10 has set aside N+1 registers. These registers are identified as IMAGE0 through IMAGEN. As will be explained hereinafter, a particular bit pattern is initially stored in the register IMAGE0. Use of the term register is not to be taken as implying that any of the IMAGE locations necessarily require dedicated hardware registers. Preferably, these are software registers, i.e. read/write memory locations.

As shown, the first call (the first sequence of MOV, CALL, MOV instructions) in the loop transfers the bit pattern at IMAGE0 to a specified register, AL. Thereafter, the routine WCHDOG is called. After that routine returns, the call concludes by transferring a bit pattern from another register, AH to IMAGE1. As is apparent from the next call, the bit pattern now in IMAGE1 is the bit pattern passed to the routine WCHDOG, and on its return the register IMAGE2 is loaded with a bit pattern which is derived from WCHDOG. Finally, the last call in the program loop transfers a bit pattern from the routine WCHDOG to the register IMAGE0, where it is available on the first call of the next loop, and so forth.

Reference is now made to FIG. 3 to illustrate the functions accomplished by WCHDOG.

More particularly, in a first function F1, WCHDOG masks the bit pattern in the register AL. This is the bit pattern passed on the call to WCHDOG. On the first call, the bit pattern will be the bit pattern from the register IMAGE0. Masking the contents of AL is provided to select a particular bit, i.e. the bit determined by the particular mask. Thereafter, function F2 sets a particular output bit of a particular port (BIT1), equal to the masked result, in other words, the condition of BIT1 at the output port is set to coincide with the selected bit from the register AL. Function F3 sets BIT2 low. BIT2 is normally high and thus function F3 changes the condition of the bit to a temporary condition. Function F4 then performs a predetermined manipulation on the bit pattern stored in the register AL. For example, in this embodiment, a circular shift right, with the most significant bit being returned to the least significant bit position. The result of this shift is stored in the register AH. Thereafter, function F5 provides a delay. This ensures that the signals at the output pins BIT1 and BIT2 are maintained in their conditions set at functions F2 and F3 for a sufficiently long period of time for the external hardware to recognize them. At the conclusion of the delay, function F6 sets BIT2 high, i.e. it returns this bit to its normal condition. Thereafter, function F7 resets BIT1 and that concludes the routine.

Accordingly, by reviewing FIGS. 2 and 3 in combination, it should be apparent that each time WCHDOG is called, the bit pattern passed to it (in the register AL) results in a particular bit of this pattern being coupled to output port BIT1, namely that bit selected by the particular mask employed in function F1. In addition, the clocking bit, i.e. BIT2 is altered from its normal condition to a temporarily different condition, and back to its normal condition. Furthermore, the bit pattern passed to the routine is manipulated, and passed back to the calling routine, in register AH.

The preceding description has omitted a detailed explanation of the instruction execution processes as such are well known. Thus, the processor's stored program and hardware structure provide a program means for executing the steps of the program.

Returning to FIG. 1 then, we can investigate the effect on the apparatus of the changing conditions on the output pins BIT1 and BIT2. As shown in FIG. 1, BIT2 is coupled to the clocking input of shift register 15 and the load $\overline{LOAD}$ input of shift register 20. Shift register 15 has stored a particular bit pattern, which is determined by jumpering selected inputs to ground, and omitting other jumpers. Each time the shift register 15 is clocked, the bit pattern that it stores is shifted one place to the right, and the bit shifted off the end (most significant bit) is recirculated to the input. At the same time, this same bit is coupled as one input to the exclusive NOR gate 16. The same clocking input partially enables the gate 17. The other input to the exclusive NOR gate 16 is provided by the BIT1 pin of the output port. Assuming that the bits are identical, the AND gate 17 is not enabled. On the other hand, if the bits are different, the gate is enabled, the OR gate 18 passes the output and the processor 10 is reset.

Assuming that the bit pattern stored in the processor register IMAGE0, and the bit pattern initially stored in the shift register 15 are identical, then so long as the main program loop is executed in sequence, and the particular bit masked by the mask provided in function F1 is the most significant bit, then the two bits at the exclusive NOR gate 16 will be identical and the processor will not be reset. On the other hand, if one of the calls in the main program loop is improperly executed or skipped, then the bit pattern manipulations will fall out of step. At that time, or sometime subsequent thereto, the inputs provided to the gate 16 will differ and the processor will be reset. A condition of this occurring is that the bit pattern employed is not all ones or all zeros; any other bit pattern will reveal the fault either immediately or in one of the subsequent calls.

Those skilled in the art will appreciate that the particular bit pattern manipulation employed in the processor 10 and the shift register 15 are merely exemplary. Any other bit pattern manipulation which is capable of being performed in the processor 10 and in external hardware (or in software in another checking processor) is suitable.

Furthermore, the selection of the most significant bit in the bit patterns, for comparison is relatively arbitrary. Theoretically, any bit in the bit patterns could be selected for comparison. Selecting the most significant bit, i.e. the one shifted out of shift register 15, simplifies the external hardware. Nevertheless, with the use of relatively simple flip-flops, the same hardware can be arranged to effect the comparison on any bit of the stored bit pattern. The hardware logic of FIG. 1 may, as is well known, be implemented in a variety of forms.

The timing function is carried out by the shift register 20 and the counter 25 The counter 25 is clocked at a fixed rate. Since the counter 25 in the example of FIG. 1 is four stages long, if it is not cleared before it reaches its fourth stage, the resetting input is provided to the processor 10. The counter 25 can be cleared by the shift register 20, particularly by the S0 output thereof. The clearing of counter 25, however, requires a "high" output bit. The pattern stored in the shift register 20 is shifted at a different fixed rate by the clocking input of the shift register 20; in the example shown in FIG. 1 at a 2.5 MHz rate. Since the length of the shift register 20 is limited, it must be periodically reloaded (with at least some "high" bit positions) or the shift register 20 will be, after a short period, incapable of clearing the counter 25. This is true because its shift input terminal SI is arranged to input "low" bits as the contents of the shift register 20 are shifted. Reloading of the shift register contents is provided by the clock output (BIT 1). Accordingly, each time the routine WCHDOG is called, the register 20 is reloaded. Since the loading function of the shift register 20 requires a clock transition, the software in the processor 10 must continually provide this transition. In the absence of such a transition, the counter 25 will count up and reset the processor 10.

It should now be clear why the first bit of the shift register 20 should be low. If the shift register 20 freezes or its output bit sticks, a high bit at this point will maintain the counter 25 cleared and render the timer itself inoperative. For this reason, the first bit, i.e. the most significant bit of the shift register 20, should be continually loaded with a zero, as is indicated in FIG. 1.

Although the arrangement of the shift register 20 and counter 25 provides an effective timer, especially in view of the fact that the software does not have direct control over the timer and thus cannot maintain it reset, those skilled in the art will appreciate that other varieties of timers could be employed.

It should also be apparent that for the processor 10 and associated apparatus to maintain itself normally running, and not reset, the bit pattern in register IMAGE0, on initialization, must match the bit pattern in the shift register 15. This can be provided, on initialization, by clocking shift register 15 at least once for each bit in the pattern, and coupling the $\overline{SO}$ terminal to the processor 10 input terminal, as shown in FIG. 1. This signal $\overline{SRINPUT}$ is the bit pattern which is then stored in IMAGE0 after inversion, either by a hardware inverter or internal of processor 10. Since the register 15 is cycled once, the pattern after the cycling is identical to the pattern at the beginning of the cycle. These functions can be effected as part of the initialization routine of processor 10 which is performed on each reset.

It should also be apparent that this is not essential to the invention, and the bit pattern manipulated by the processor 10 may be provided as part of its program and the same pattern correspondingly provided in the shift register 15. Since FIG. 2 does not illustrate the main program loop, other than by indicating that at several locations therein a calling routine is provided, it should be apparent that it is preferable to locate the calling routines at particularly critical locations of the main program loop. This ensures that those particularly critical locations must be executed or the processor will be reset. It should be apparent that it is not essential to provide a different software register for each different point at which the calling routine is located, a single software register could be employed which is used twice by each calling routine or two software registers could be used which are employed in alternating sequence by sequential calling routines. However, it is preferred to provide a different software register for each calling routine. This ensures that the bit pattern manipulation will fall out of step if even a single one of the calling routines is skipped.

Although the particular location of the software registers employed by the calling routines has not been specified, it should be apparent that these software registers could be located anywhere within read/write memory. However, preferably, the software registers are distributed throughout the read/write memory which is employed in the program. This increases the probability that improper program execution (where, for example, all the calling routines are executed properly in the appropriate sequence) which improperly overwrites data which should not be altered, will probably include one or more of the software registers used by the calling routine. In such a case, of course, the bit pattern manipulation will eventually force a reset.

From the foregoing, it should be appreciated that the invention provides apparatus to track appropriate execution of a program in a processor 10. As has been pointed out, many changes can be made within the spirit and scope of the invention. In addition to those modifications already expressly discussed, it should also be understood that the number of bits of the bit pattern being matched need not be one, i.e. two or more bits from the pattern or the entire pattern can be matched on each call, if desired. Furthermore, processing can be provided, on initialization, and perhaps at other times, to test that the bit pattern internal to the processor 10 is not made up of all zeros or all ones. Since these and other changes may be made without departing from the spirit and scope of the invention, the protection desired is to be determined from the claims.

I claim:

1. Apparatus for tracking appropriate program execution of a digital processor including:

program means stored in a memory of said digital processor and including first and second program segment means, said first program segment means including means for accessing a watchdog routine for passing a bit pattern to said watchdog routine and accepting a bit pattern therefrom, said second program segment means comprising said watchdog routine which includes means for (1) outputting a particular bit of said bit pattern passed on said access, (2) manipulating said bit pattern in a predetermined fashion, (3) returning said manipulated bit pattern to said accessing routine and (4) sequentially changing a clocking bit from an initial condition to a different temporary condition and back to said initial condition, and, external to said processor bit pattern means including an input for storing another bit pattern, and including means for:

(1) manipulating said another bit pattern in a manner identical to said predetermined fashion, and (2) comparing said outputted particular bit with a selected bit of said stored another bit pattern each time said clocking bit exhibits said sequential changes, and reset means for resetting said processor if said comparison effected by said bit pattern means results in an inequality.

2. The apparatus of claim 1 further including a means responsive to said clocking bit for maintaining a timer means in one condition for so long as said clocking bit is sequentially changed at a rate in excess of a threshold and including means for attaining a different condition for said timer means is said another bit fails to exhibit said sequential changes at a rate in excess of said threshold, and wherein said reset means includes means to reset said processor if said timer means attains said different condition.

3. The apparatus of claim 1 in which said memory of said digital processor includes a different storage location for storing said bit pattern received on each said access.

4. The apparatus of claim 1 in which said bit pattern means includes:
- a shift register of length equal to said another bit pattern,
- means clocking said shift register each time said clocking bit undergoes said sequential changes,
- means coupling said output of said shift register back to an input of said shift register,
- an OR gate with one input coupled to an output of said shift register and another input receiving said outputted particular bit, and said reset means includes:
- means for coupling an output of said OR gate to said digital processor.

5. The apparatus of claim 4 which further includes:
- means for timing a predetermined period,
- means responsive to an expiration of said period for providing an output to said reset means, and
- means responsive to said sequential changes of said clocking bit for clearing said means for timing.

6. A method of tracking appropriate program execution of a processor including the steps of:
- a. distributing a plurality of instruction groups within said program whose execution is to be checked,
- b. each of said instruction groups retrieving a bit pattern from a first predetermined storage location, accessing a watchdog routine for execution thereof, passing the bit pattern retrieved from said predetermined storage location to said watchdog routine, and on return from said watchdog routine, writing a bit pattern received from said watchdog routine to a second predetermined storage location,
- c. and providing said watchdog routine to effect the functions of:
  1. outputting, at a first output location of the processor, a bir from said bit pattern retrieved by said instruction groups,
  2. manipulating said bit pattern received by said watchdog routine and passing said manipulated bit pattern on a return from said access,
  3. providing a sequential alteration of a clocking bit at a second output location of the processor from an initial condition, to a temporarily different condition, and back to said initial condition, and
  4. returning from said access, and external to said processor:
- d. providing for storage of an external bit pattern,
- e. manipulating said external bit pattern in a fashion identical to step c(2) each time said second output location undergoes said sequential alteration,
- f. comparing said output bit at said first output location with a selected bit of said stored external bit pattern, and
- g. resetting said processor in the event said comparison produces an inequality.

7. The method of claim 6 which further includes the steps of:
- h. monitoring the period between sequential outputs provided as a result of step c(3) and
- i. resetting said processor in the event said period exceeds a threshold.

8. The method of claim 7 in which said monitoring step comprises the step of:
1. providing a counter to count up at a predetermined rate from a zero condition to a terminal condition, and providing a signal when said terminal condition is reached,
- continuously shifting out the contents of a shift register to provide a clearing signal for said counter, while maintaining a low input on a serial input terminal of said shift register,
- reloading said shift register with a bit pattern including at least one high bit each time said step c(3) is performed,
- whereby said counter is cleared prior to reaching its terminal count so long as said shift register is reloaded at an appropriately high rate.

9. The method of claim 8 in which said shift register is reloaded with the bit pattern which includes a "low" bit in the most significant position.

10. The method of claim 6 in which said first and second predetermined storage locations are different for each of said instruction groups.

11. The method of claim 6 wherein all of said first and second predetermined storage locations are distributed through a read/write memory of said processor.

* * * * *